Nov. 12, 1963 W. O. DIXON ETAL 3,110,277

CHILL RING

Filed March 16, 1959 2 Sheets-Sheet 1

INVENTOR.
W. O. Dixon
BY Joseph A. Cunningham

ATTORNEY C. M. McKnight

CHILL RING

Filed March 16, 1959 2 Sheets-Sheet 2

INVENTOR.
W.O. Dixon
BY Joseph A. Cunningham
ATTORNEY C. M. McKnight

United States Patent Office 3,110,277

Patented Nov. 12, 1963

3,110,277

CHILL RING

Willis O. Dixon, Wichita, Kans., and Joseph A. Cunningham, Tulsa, Okla., assignors, by mesne assignments, to Crose-United Corporation, Tulsa, Okla., a corporation of Oklahoma Filed Mar. 16, 1959, Ser. No. 799,779
6 Claims. (Cl. 113—102)

This invention relates to improvements in pipe welding apparatus, and more particularly, but not by way of limitation, to a chill ring for utilization as a back up member during the welding of adjacent ends of tubular members, such as pipe sections.

In the welding of adjacent ends of pipe sections, and the like, the pipe sections are normally clamped together in longitudinal alignment whereby a circumferential weld may be utilized for uniting the two sections. In order to obtain an efficient weld, it is usually necessary that the weld penetration extend to the bottom edge of the joint. However, the molten metal tends to sag toward the center of the tubular members being united and may burn completely through the metal of the pipe sections without effecting a weld or uniting the sections. In addition, the molten metal may form a substantially large metal bead around the inner periphery of the weld unless certain precautions are taken. The formation of an excessively large inwardly extending bead around the welded joint is usually undesirable in that it may obstruct the flow of fluids through the pipe sections, or may hamper the utilization of cleaning machines or other equipment frequently moved longitudinally through the line.

In order to preclude the complete burning through of the weld and the formation of a large metal bead around the inner periphery of the welded pipe joint, the usual practice today is to provide an internal back up or chill ring member for disposition adjacent the pipe joint during the welding process. The back up member or chill ring normally comprises a plurality of arcuate segments which are radially expandable and contractable in order to facilitate the disposition of the ring within the pipe sections and adjacent the joint to be welded. There are certain disadvantages in these chill rings in that in the expanded position thereof, there is usually a gap between each of the adjacent arcuate segments, thereby leaving spaced portions of the pipe joint open or not backed up during the welding process. It will be apparent that the molten weld metal may sag inwardly at each of the unprotected portions of the joint, thereby providing a plurality of inwardly extending nodules of metal. In addition, the hot welding torch may burn completely through the metal of the pipe sections at the exposed portions, thus resulting in an inefficient weld between the two pipe sections.

The present invention contemplates a novel chill ring or back up member for utilization during the welding of adjacent tubular members wherein a continuous ring is provided adjacent the inner periphery of the abutting pipe sections. Thus, the entire joint to be welded is provided with a chill ring to assure an efficient welding of the joint without the danger of a complete burning through at the joint, or the formation of a large metal bead on the inner periphery of the united sections. The novel chill ring is particularly designed and constructed to be utilized with an internal pipe clamping apparatus, such as shown in the F. S. Miller Patent No. 2,830,551, issued April 15, 1958, and entitled "Self-Centering Pneumatic Inside Line-Up Pipe Clamp Assembly," and is analogous to but presents a novel apparatus over the A. M. Cromwell Patent No. 2,780,194, issued February 5, 1957, and entitled "Internal Back-Up Clamp for Girth Welding." However, the chill ring itself is in no manner adapted to clamp the adjacent pipe sections, but functions or serves only as a back up member for the weld at the joint between the two sections. The novel chill ring comprises a plurality of arcuate segments adapted to be carried by a portion of the clamping members of the pipe clamp, and may be moved radially inward therewith for facilitating the disposition of the clamp and the chill ring within the pipe to be welded. The segments of the chill ring may then be moved radially outward with the clamping members to provide a continuous back up or chill ring for the welding operation. The novel chill ring is simple and efficient in operation and economical and durable in construction.

It is an important object of this invention to provide a chill ring to be applied to the underside of a circular joint or seam during the welding thereof.

It is another object of this invention to provide a chill ring for a circular seam which may be radially expanded into contact with the underside of the seam for backing up the welding thereof and radially contracted to facilitate removal after completion of the welding operation.

Another object of this invention is to provide a chill ring for a circular seam between two tubular members which is so designed and constructed to provide a continuous back up ring for the welding operation.

Still another object of this invention is to provide a chill ring for a welded joint between two tubular members which is adapted for cooperation with an internal pipe clamp apparatus, but which in no manner functions as a pipe clamp itself.

A further object of this invention is to provide a novel back up ring for a circular seam which is simple and efficient in operation and economical and durable in construction.

Other objects and advantages of the invention will be evident from the following detailed description, read in conjunction with the accompanying drawings, which illustrate our invention.

Figure 1:
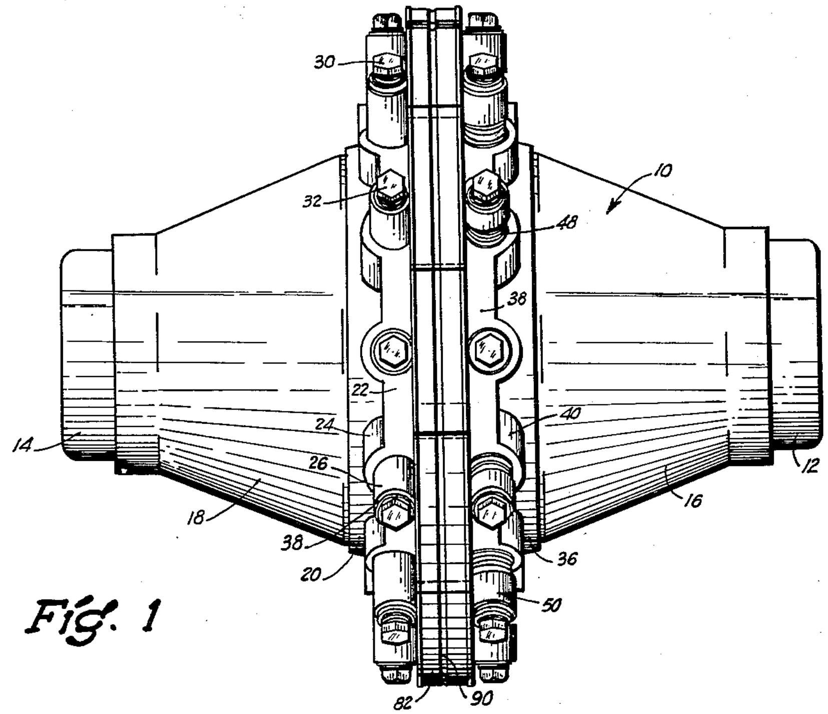
FIGURE 1 is a side elevational view of a portion of a pipe clamping apparatus having the novel chill ring provided thereon.

Referring to the drawings in detail, reference character 10 refers in general to a suitable internal pipe clamping apparatus, such as that disclosed in the aforementioned patent to F.S. Miller. The pipe clamp 10 is provided with a pair of oppositely disposed air cylinders 12 and 14 of any well known type each secured to a substantially conical shaped housing 16 and 18, respectively. A suitable disc 20 is secured to the housing 18 in any well known manner (not shown) and is oppositely disposed thereon with respect to the air cylinder 14. A circumferential flange 22 extends radially outward from the outer periphery of the disc 20 and is provided with a plurality of circumferentially spaced enlarged portions or arcuate boss members 24. A radially extending piston member 26 is slidably disposed in the flange 22 adjacent each of the boss members 24. A spacer ring 28 is secured to the outer extremity of each piston 26 by means of a suitable bolt member 30, or the like.

The air cylinder 14 is provided with suitable connection means (not shown) whereby communication is established between the air cylinder and each of the pistons 26 for a simultaneous application of air pressure thereto. Application of air pressure from the air cylinder 14 to the pistons 26 causes the pistons to move radially outward whereby the exposed outer face 32 of the pistons 26 will bear against the inner periphery of one of the abutting pipe sections 34 within which the clamping apparatus 10 is disposed. Upon an exhausting of the air pressure from the pistons 26, suitable spring means (not shown) is utilized for radially contracting the pistons 26 whereby the faces 32 will be moved away from contact with the inner periphery of the pipe section 34.

A disc 36 similar to the disc 20 is secured to the housing 16 and is oppositely disposed from the air cylinder 12. A circumferential flange 38 extends radially outward from the outer periphery of the disc 36 and is provided with a plurality of circumferentially spaced enlarged portions or arcuate boss members 40 similar to the boss members 24. A piston member 42 is slidably disposed in the flange 36 adjacent each of the boss members 40. The air cylinder 12 is provided with suitable connection means (not shown) whereby communication is established between the air cylinder and each of the pistons 42 for a simultaneous application of air pressure thereto. Application of air pressure from the air cylinder 12 to the pistons 42 causes the pistons to move radially outward for a purpose as will be hereinafter set forth. Upon an exhausting of the air pressure from the pistons 42, suitable spring means (not shown) is utilized for radially contracting the pistons 42, as will be hereinafter set forth.

Each of the pistons 42 is provided with a reduced neck portion 44 at the outer end portion thereof. A circumferential flange 46 is provided at the base of the reduced neck 44 for receiving one end of a suitable spring 48 thereagainst. A chill segment support member, generally indicated at 50, is provided with a longitudinal bore 52 extending therethrough for receiving the reduced neck portion 44. A chill segment support 50 is slidably disposed on the reduced neck 44 of each piston 42 and is supported thereon by the spring 48.

Every other piston 42, or alternate pistons designated 42*a* are provided with a spacer ring 54 at the outer extremity of the reduced neck 44 which is secured thereto by means of a suitable bolt 56. The spacer ring 54 bears against the upper or outer surface 58 of the chill segment support 50 and cooperates with the spring 48 for securing the support 50 on the neck portion 44. It will be apparent that the support 50 will therefore move inwardly and outwardly simultaneously with the piston 42*a* for a purpose as will be hereinafter set forth.

Figure 3:
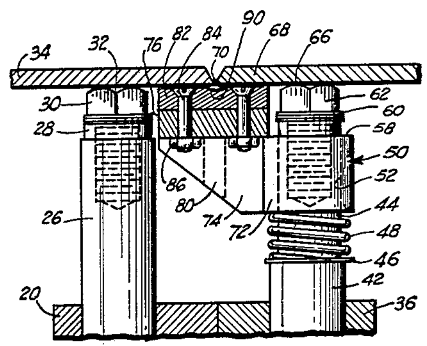
FIGURE 3 is an enlarged sectional view of a portion of the clamping apparatus depicting the chill ring in an expanded position and adjacent the circular seam between two adjacent tubular members.

The remaining pistons 42 are not provided with the spacer rings 54, but in lieu thereof are each provided with a flanged ring 60 secured thereto by a suitable bolt 62. The flanged ring 60 is spaced from the upper face 58 of the chill segment support 50 when the piston 42 is in the radially extended position, as clearly shown in FIG. 3, thus permitting longitudinal movement of the support 50 with respect to the piston 42, for a purpose as will be hereinafter set forth. When the pistons 42 and 42*a* are in the radially extended position, the outer faces 64 and 66 of the bolts 56 and 62, respectively, are in contact with the inner periphery of the second pipe section 68 (FIG. 3).

The pipe sections 34 and 68 are normally in an end to end alignment with the abutting faces thereof providing a circular seam 70 which may be welded in any well known manner (not shown) for uniting the pipe sections 34 and 68 into a common length of pipe. The contact between the bolts 30 and the inner periphery of the pipe section 34 securely clamps the pipe section 34 during the welding operation. Similarly, the contact between the bolts 56 and 62 and the inner periphery of the pipe section 68 securely clamps the pipe 68 during the welding operation for increasing the efficiency thereof. In addition, the radially outward pressure exerted by the bolts 30, 56 and 62 on the inner periphery of the pipe sections 34 and 68 tends to overcome any out-of-round condition which may exist in the abutting ends of the pipe sections, thereby assuring that the circular seam 70 therebetween is substantially a true circle.

The chill segment support member 50 comprises a substantially cylindrical portion 72 encasing the longitudinal bore 52. A web member 74 of substantially triangular configuration extends radially outward from the cylindrical portion 72. The web 74 is preferably disposed parallel to the longitudinal axis of the clamping apparatus 10 in a direction toward the pistons 26 in order that the web 74 will extend across the circular seam 70 and spaced inwardly therefrom. An arcuate plate member 76 of substantially rectangular configuration is welded, or the like, to the top of the web 74 and is reenforced thereon by a pair of oppositely disposed web members 78 and 80. The web members 78 and 80 extend perpendicularly from the opposite sides of the web 74 and are disposed substantially in the longitudinal center of the plate 76 for rigidly supporting the plate 76 in a substantially perpendicular disposition with respect to the web 74. The plate 76 is disposed in substantial alignment with the circular seam 70 and is spaced radially inward therefrom.

Figure 4:
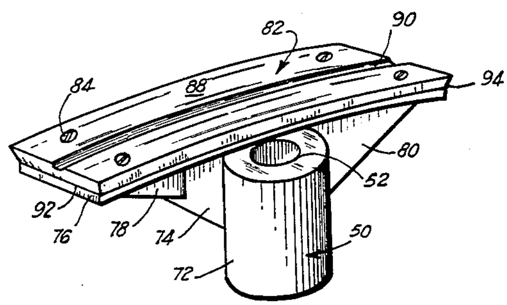
FIGURE 4 is a perspective view of a chill ring segment embodying the invention.

As hereinbefore set forth, a chill segment support member 50 is disposed on each of the pistons 42 and 42*a*. An arcuate chill segment 82 (FIG. 4) is provided on each of the support members 50 disposed on the pistons 42. The chill segment 82 is of a configuration complementary to the plate 76 and is secured to the upper surface thereof by a plurality of spaced flat head screws 84, or the like. The screws 84 are securely retained in position by suitable lock nuts 86, as is well known. The screws 84 are preferably flush with the upper surface 88 of the chill segment 82, or may be slightly countersunk therein, if desired, in order that there will be no interference therefrom in the operation of the chill segments 82. A longitudinally extending groove 90 is provided in the chill segment 82 and is substantially centrally disposed therein whereby the groove 90 will be in substantial alignment with the circular seam 70 during the welding operation, as will be hereinafter set forth. The opposed transverse end portions 92 and 94 of the segment 82 are tapered inwardly and downwardly as viewed in FIG. 4 for a purpose as will be hereinafter set forth.

Figure 5:
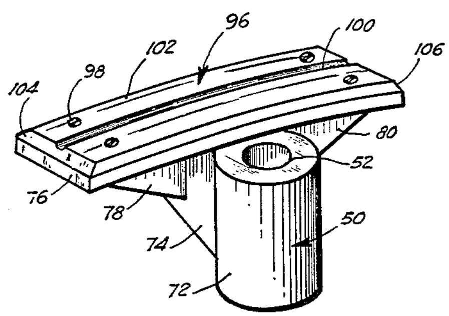
FIGURE 5 is a perspective view similar to FIG. 4 of a chill ring segment embodying the invention.

An arcuate chill segment 96 (FIG. 5) is provided on each of the support members 50 disposed on the pistons 42*a*. The chill segment 96 is of a configuration complementary to the plate 76 and is secured to the upper surface thereof by a plurality of spaced flat head screws 98 in the manner hereinbefore set forth with regard to the chill segments 82. A longitudinally extending groove 100 is provided in the upper surface 102 of the chill segment 96 and is centrally disposed therein whereby the groove 100 is substantially in alignment with the circular seam 70 for a purpose as will be hereinafter set forth. The opposed transverse end portions 104 and 106 of the chill segment 96 are inwardly and upwardly tapered as viewed in FIG. 5. The tapered surfaces 104 and 106 are of a configuration complementary to the tapered end portions 92 and 94, respectively, of the chill segment 82.

*Operation*

When it is desired to unite the pipe sections 34 and 68 by welding at the circular seam 70, the pipe clamping apparatus 10 is preferably inserted in the pipe section 34 in any well known manner (not shown) whereby the pistons 26 are disposed in the proximity of the end to be welded. The air cylinder 14 may then be actuated in any well known manner (not shown) for supplying air pressure to all of the pistons 26 whereby the pistons will be simultaneously radially expanded into a clamping engagement with the inner periphery of the pipe 34. As set forth in the aforesaid F. S. Miller patent, the radially outward pressure of the pistons 26 on the pipe 34 will tend to overcome any out-of-round condition which may exist in the pipe in order that the end of the pipe 34 to be welded will be substantially a true circle.

The second pipe section 68 may be disposed in an end to end abutting relation to the pipe 34 whereby the pistons 42 and 42*a* of the clamping apparatus 10 will be disposed therein adjacent the end of the pipe 68 to be welded. The pipe section 68 is preferably manually aligned with the pipe section 34 to establish as true an alignment as possible therebetween. The air cylinder 12 may then be actuated in any well known manner (not shown) to supply air pressure to the pistons 42 and 42*a* whereby the outer faces 64 and 66 of the bolts 56 and 62, respectively, will be brought into clamping contact with the inner periphery of the pipe section 68. As hereinbefore set forth, the radially outward pressure of the pistons 42 and 42*a* will tend to overcome the out-of-round condition of the pipe section 68 to provide a substantially true circle adjacent the pipe section 34. Thus, the circular seam 70 will be of a substantially true circular configuration.

It will be apparent that the chill segment support members 50 move radially outward simultaneously with the pistons 42 and 42*a*. The pressure of the springs 48 constantly urges the support members 50 radially outward on the pistons 42 and 42*a*. Thus, the support members 50 will be urged outwardly whereby the chill segments 82 and 96 will be in contact with the inner periphery of the circular seam 70 in the expanded position of the pistons 42 and 42*a*. It is preferable to utilize a backing strip (not shown) between the circular seam 70 and the chill segments 82 and 96, as is well known in the art. The backing strip is usually a continuous fibrous cylindrical ring of a size to fit snugly on the chill segments in the expanded position, and greatly facilitates the welding operation, as is well known.

Figure 2:
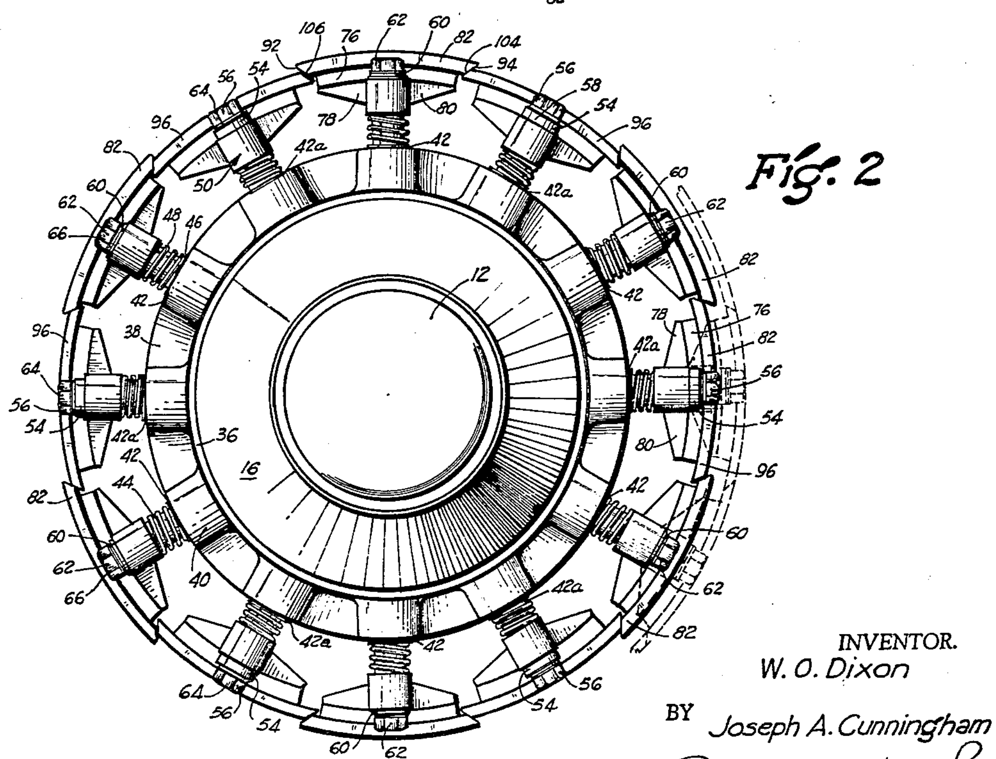
FIGURE 2 is an end elevational view of a portion of a pipe clamping apparatus having the novel chill ring provided thereon and depicted with the chill ring in a collapsed position in solid lines and in an expanded position in dotted lines.

As clearly shown in FIG. 2, the adjacent chill segments 82 and 96 form a continuous ring in the radially expanded position of the pistons 42 and 42*a*. The tapered end portion 92 of each chill segment 82 is disposed adjacent the tapered end portion 106 of the adjacent chill segment 96, and similarly the tapered end portion 94 is disposed adjacent the tapered end portion 104, thereby providing a continuous cylindrical chill ring adjacent the inner periphery of the circular seam 70. The circular seam 70 may then be welded in any well known manner (not shown). The continuous chill ring formed by the plurality of arcuate chill segments 82 and 96 backs up the weld at the seam 70, thereby preventing the weld from burning right through the metal and precluding the molten weld metal from falling into the interior of the pipe sections. The chill ring absorbs much of the heat from the molten metal of the weld for a cooling thereof. The welding operation is usually substantially slow, and the chilling of the weld metal by the chill ring accelerates the setting up or hardening of the weld metal, thereby greatly facilitating the welding operation.

It has been found in actual practice that it is preferable to permit the weld metal to drop down slightly at the point of the weld in order to assure that the entire seam 70 will be efficiently welded. The longitudinal grooves 90 and 100 are provided in the chill segments 82 and 96, respectively, for this purpose. It will be apparent that in the extended position of the pistons 42 and 42*a*, the grooves 90 and 100 will be in axial alignment, thereby providing a continuous circular groove in the chill ring adjacent the circular seam 70. The molten weld metal will flow into the groove thus provided and form a very slight internal bead at the weld to assure that the seam 70 is efficiently welded. This bead is preferably very slight in order that there will be no interference in the inner periphery of the welded pipe sections to hinder the passage of fluid or equipment therethrough. The backing strip hereinbefore set forth will tend to sag under the weight of the molten weld metal, and will assume the configuration of the groove. The heat from the molten metal will burn or disintegrate the backing strip, thus leaving only the metal bead adjacent the chill ring upon completion of the welding operation.

When the welding of the seam 70 has been completed, and it is desired to remove the clamping apparatus 10 from the united pipe sections 34 and 68, the air cylinders 12 and 14 are actuated in any well known manner (not shown) for simultaneously releasing the air pressure from the pistons 26, 42 and 42*a*. As hereinbefore set forth, the release of the air pressure on the pistons permits the pistons to be moved radially inward and out of contact with the inner periphery of the united pipe sections 34 and 68. The chill segment support members 50 disposed on the pistons 42*a* will move simultaneously radially inward with the pistons 42*a* with no relative movement therebetween. The spacer ring 54 adjacent the upper surface 58 of the support members 50 will force the support members to move against the action of the spring 48 and thus will be radially contracted simultaneously with the pistons 42*a*. The chill segments 96 will therefore be moved radially inward and out of contact with the welded seam 70.

It will be apparent in FIG. 3 that the flanged ring 60 is spaced from the support members 50 disposed on the pistons 42 in the expanded position of the pistons 42. Thus, the pistons 42 will move radially inward a slight distance without moving the support members 50 disposed thereon. When the flanged ring 60 is brought into contact with the upper surface 58 of the support 50, any continued radial inward movement of the piston 42 will be transmitted to the support member 50 for moving the chill segment 82 away from the welded seam 70. From FIG. 2, it will be apparent that the chill segments 82 are spaced slightly radially further from the central axis of the clamping apparatus 10 than the chill segments 96 in the contracted position of the pistons 42 and 42*a*. The cooperating tapered surfaces 92 and 106, and 94 and 104 permit the chill segments 82 and 96 to assume a slightly overlapping position in the contracted position thereof. This is necessary in order that a complete circular chill ring will be provided in the expanded position of the chill segments. However, the chill segments 82 are completely out of contact with the inner periphery of the pipe sections in the contracted position, thereby permitting the clamping apparatus 10 to be withdrawn from the welded pipe members in any well known manner (not shown).

From the foregoing, it will be apparent that the present invention provides a novel chill ring for facilitating the welding of a circular seam between two adjacent tubular members. The chill segments are so designed and constructed to provide a continuous cylindrical ring in the radially expanded position thereof for backing up the weld, thus greatly facilitating the welding operation. In addition, the chill segments may be radially contracted in order to permit ready removal of the pipe clamping apparatus from the interior of the welded or united tubular members. The novel chill ring is simple and efficient in operation and economical and durable in construction.

Changes may be made in the combination and arrangement of parts as heretofore set forth in the specification and shown in the drawings, it being understood that any modification in the precise embodiment of the invention may be made within the scope of the following claims without departing from the spirit of the invention.

What we claim is:

1. In combination with a pipe clamping apparatus having at least two sets of independently radially expandable and contractable clamping members, a chill ring for disposition coaxially of and between the two sets of clamping members and adjacent the inside of a joint between adjacent ends of tubular members to be welded together, and comprising a plurality of arcuate chill segments, chill segment support members carried by one set of the clamping members only for radially expanding and contracting the chill segments, spring means carried by the said one set of clamping members for urging said chill segments into contact with the pipe joint in the radially expanded position of the apparatus, the chill segments cooperating to provide a continuous cylindrical ring in the radially expanded position of the clamping members, means cooperating between the said one set of clamping members and support members carried thereby for moving the support members toward a radially contracted position upon radial contraction of the clamp members, and each pair of adjacent chill segments provided with complementary tapered end portions to provide for relative movement between the adjacent support members on the respective clamping members whereby adjacent chill segments will be in an overlapping position in the radially contracted position of the chill segments.

2. In combination with a pipe clamping apparatus having a least two sets of independently radially expandable and contractable clamping members, a chill ring for disposition adjacent the inside of a joint between adjacent ends of tubular members to be welded together and coaxially of and between the two sets of clamping members, and comprising a plurality of arcuate chill segments, support members carried by one set of the clamping members only for radially expanding and contracting the chill segments, spring means carried by the said one set of clamping members for urging said chill segments into contact with the inner periphery of the tubular member joint, the chill segments cooperating to provide a continuous cylindrical ring in the radially expanded position thereof, means cooperating between the said one set of clamping members and the support members carried thereby for moving the support members toward a radially contracted position upon radial contraction of the clamping members, and adjacent end portions of the chill segments having complementary tapered configurations providing for relative movement between the adjacent support members on the respective clamping members whereby adjacent chill segments will be in an overlapping position in the radially contracted position of the chill segments.

3. In combination with a pipe clamping apparatus having at least two sets of independently operable circumferentially spaced radially expandable and contractable clamping members, a chill ring for disposition adjacent the inside of a joint between adjacent ends of tubular members to be welded together and coaxially of and between the sets of clamping members, and comprising a plurality of arcuate chill segments, support members for the chill segments carried by one of the sets of circumferentially spaced clamping members only for radially expanding and contracting the chill segments, spring means carried by the said one set of clamping members for urging the chill segments into contact with the pipe joint, tapered transverse end portions provided on alternate chill segments, oppositely tapered transverse end portions provided on the remaining chill segments, said end portions cooperating to provide a substantially continuous cylindrical ring in the radially expanded position of the chill segments, means cooperating between the said one set of clamping members and the support members carried thereby for moving the support members against the action of the spring means upon radial contraction of the clamping members, and said end portions of the chill segments cooperating to permit an overlapping position of the adjacent chill segments in the contracted position of the chill segments.

4. In combination with a pipe clamping apparatus having at least two sets on independently operable circumferentially spaced radially expandable and contractable clamping members, a chill ring for disposition adjacent the inside of a joint between adjacent ends of tubular members to be welded together and coaxially of and between the sets of clamping members, and comprising a plurality of arcuate chill segments, support members for the chill segments carried by one of the sets of circumferentially spaced clamping members only for radially expanding and contracting the chill segments, spring means carried by the said one set of clamping members for urging the chill segments into contact with the pipe joint, transverse tapered end portions provided on alternate chill segments, oppositely tapered transverse end portions provided on the remaining chill segments, said end portions cooperating to provide a substantially continuous cylindrical ring in the radially expanded position of the chill segments, means cooperating between the said one set of clamping members and the support members carried thereby for moving the support members against the action of the spring means and toward a contracted position during radial contraction of the clamping members, and said end portions of the chill segments cooperating to permit an overlapping position of the adjacent chill segments in the contracted position of the chill segments.

5. In combination with a pipe clamping apparatus having at least two sets of independently operable circumferentially spaced radially expandable and contractable clamping members, a chill ring for disposition adjacent the inside of a joint between adjacent ends of tubular members to be welded together and coaxially of and between two sets of clamping members, and comprising a plurality of arcuate chill segments, chill segment support members carried by only one of the sets of circumferentially spaced clamping members for radially expanding and contracting the chill segments simultaneously with radial movement of the clamping members, spring means carried by the said one set of clamping members for urging said chill segments into contact with the tubular joint, tapered transverse end portions provided on alternate chill segments, oppositely tapered transverse end portions provided on the remaining chill segments, said tapered portions cooperating to provide a substantially continuous cylindrical ring in the radially expanded position of the chill segments, a longitudinally extending groove centrally provided in each chill segment whereby a continuous circular groove is provided adjacent the joint to be welded in the expanded position of the chill segments, means cooperating between the said one set of clamping members and the support members carried thereby for moving the support members against the action of the spring means and toward a radially contracted position during radial contraction of the clamping members, and said end portions also cooperating to provide an overlapping position for the adjacent chill segments in the radially contracted position of the chill segments.

6. In combination with a pipe clamping apparatus having at least two longitudinally spaced sets of independently operable circumferentially spaced radially expandable and contractable clamping members, a chill ring for disposition adjacent the inside of a joint between adjacent ends of tubular members to be welded together, and comprising a plurality of arcuate chill segments, chill segment support members carried only by one of the sets of circumferentially spaced clamping members for radially expanding and contracting the chill segments, spring means carried by the said one set of clamping members for using said chill segments into contact with the pipe joint, tapered transverse end portions provided on alternate chill segments, oppositely tapered transverse end portions provided on the remaining chill segments, said end portions cooperating to provide a substantially continuous cylindrical ring in the radially expanded position of the chill segments, a longitudinally extending groove centrally provided on each of the chill segments whereby a continuous circular groove is provided adjacent the joint to be welded in the expanded position of the chill segments, means cooperating between the said one set of clamping members and the support members carried thereby for moving the support members against the action of the spring means and toward a contracted position during radial contraction of the clamping members, and the end portions of the chill segments also cooperating during the radially inward movement of the segments whereby the adjacent chill segments will be in an overlapping position in the contracted position of the chill segments.

References Cited in the file of this patent

UNITED STATES PATENTS

| | | |
|---|---|---|
| 2,365,226 | Stout | Dec. 19, 1944 |
| 2,408,255 | Elliott et al. | Sept. 24, 1946 |
| 2,691,952 | Wilson et al. | Oct. 19, 1954 |
| 2,694,376 | Hauser | Nov. 16, 1954 |
| 2,737,141 | Mitchell | Mar. 6, 1956 |
| 2,780,194 | Croswell | Feb. 5, 1957 |
| 2,804,836 | Tiedemann | Sept. 3, 1957 |
| 2,830,551 | Miller | Apr. 15, 1958 |
| 2,887,972 | Handley | May 26, 1959 |